United States Patent [19]

Kobayashi

[11] Patent Number: 4,827,175

[45] Date of Patent: May 2, 1989

[54] FLAT MOTOR WITH SIMPLIFIED DETECTOR ROTOR MOUNTING

[75] Inventor: Yoshiharu Kobayashi, Hyogo, Japan

[73] Assignee: Mitsubishi Denki Kabushiki Kaisha, Tokyo, Japan

[21] Appl. No.: 172,526

[22] Filed: Mar. 24, 1988

[30] Foreign Application Priority Data

Apr. 14, 1987 [JP] Japan ............................ 62-56804[U]

[51] Int. Cl.[4] ............................................ H02K 1/22
[52] U.S. Cl. ................................... 310/268; 310/68 B
[58] Field of Search ............ 310/68 B, 233, 268, 310/49 R, 154

[56] References Cited

U.S. PATENT DOCUMENTS

| 4,228,384 | 10/1980 | Arnold, Jr. et al. | 310/268 X |
| 4,336,517 | 6/1982 | Kobayashi et al. | 310/68 B |
| 4,366,402 | 12/1982 | Marsoner | 310/68 B |
| 4,374,336 | 2/1983 | Shimizu | 310/268 X |
| 4,517,480 | 5/1985 | Müller | 310/268 X |

Primary Examiner—William M. Shoop, Jr.
Assistant Examiner—Marc S. Hoff
Attorney, Agent, or Firm—Sughrue, Mion, Zinn, Macpeak and Seas

[57] ABSTRACT

A flat motor includes a rear bracket 1 of magnetic material, a permanent magnet 2 fixed to an end of the rear bracket, a front bracket 3 of magnetic material facing the permanent magnet, an armature 4 having a coil 5 thereof, a rotary shaft 7 for rotatably supporting the armature between the front bracket and the permanent magnet, and a commutator 6 pressure-fixed on the rotary shaft. A rotor 15 of a rotation detector 11 is fixed on the rotary shaft and has teeth 15c along its outer periphery. A stator 11d has an inner periphery facing the rotor teeth, a cover member 11h houses a magnet 11c and a coil 11b, the cover member being affixed to the rear bracket, and coupling members 6a, 15b establish a direct connection between the rotor and the commutator.

1 Claim, 1 Drawing Sheet

4,827,175

FLAT MOTOR WITH SIMPLIFIED DETECTOR ROTOR MOUNTING

BACKGROUND OF THE INVENTION

The present invention relates to a flat motor suitable to use in an office automation device such as copying machine.

FIG. 4 shows an example of a conventional flat motor in partial cross section. In FIG. 4, the flat motor comprises a rear bracket 1 of magnetic material, a permanent magnet 2 secured to a side surface of the rear bracket 1, a front bracket 3 of magnetic material fixed to the rear bracket 1 with a gap therebetween, an armature 4 including a coil 5 disposed between the permanent magnet 2 and the front bracket 3, a commutator 6 connected to the coil 5 and coupled to the armature 4, a rotary shaft 7 supporting the armature 4 and the commutator 6, and bearings 8 and 9 for rotatably supporting the shaft 7. The motor further includes an adapter 10 secured to the rear bracket 1 by bolts which are not shown, a rotation detector 11 constituting a frequency generator, and a brush holder 12 housing brushes 13 and springs 14 for biasing the brushes 13 toward the commutator 6. The rotation detector 11 includes a bobbin 11a on which a coil 11b is wound, a permanent magnet 11c, a stator 11d having teeth formed on an inner periphery thereof, and a rotor 11e fixed to a boss 11f of non-magnetic material and facing the stator 11d. The boss 11f is mounted on the rotary shaft 7 and coupled to the commutator 6 by pins 11g. A cover 11h of magnetic material forms a detector housing.

When a voltage is applied through a feeding circuit (not shown) to the brushes 13, the rotary shaft 7 rotates according to a relation between a current flowing through the coil 5 and magnetic flux of the permanent magnet 2, which is defined by Flemming's law. The rotation of the shaft 7 is controlled by an output of the rotation detector 11. That is, flux from the magnet 11c passes through a magnetic circuit composed of the cover 11h, the rotor 11e and the stator 11d. When the rotor 11e rotates, a voltage pulse corresponding to a variation of magnetic flux which is produced by a variation of gap caused by the teeth of the rotor 11e facing the stator 11d is induced in the coil 11b. The rotation of the motor is controlled on the basis of the number of voltage pulses.

Magnetic flux from the magnet 11c is blocked by the non-magnetic boss 11f provided in an intermediate position of the magnetic circuit to prevent it from leaking through the bearing 9 and the rotary shaft 7 to the rotor 11e, otherwise, the magnet 11c must be large enough to compensate for flux leakage. The boss 11f is usually of stainless steel or brass which is relatively expensive. Further, in order to rotate the boss 11f with the rotary shaft 7, relative rotation between the boss 11f and the shaft 7 is prevented by inserting the pins 11g pressure-inserted into the boss 11f into the commutator 6. Since the pins 11g are small, their manufacture is difficult and their pressure-insertion into the boss 11f is troublesome. In addition, due to the presence of the boss 11f, the axial dimension of the flat motor tends to increase.

SUMMARY OF THE INVENTION

An object of the present invention is to provide an inexpensive flat motor which does not require such components as a boss and pins and which has a minimum axial dimension.

A flat motor according to the present invention has a rotor, a portion of which is bent to form a tag which is directly engaged with the commutator. Therefore, the rotor can support the commutator and rotate together therewith to transmit a rotational force to a stator thereof.

DETAILED DESCRIPTION OF THE PREFERRED EMBODIMENT

Figure 1:
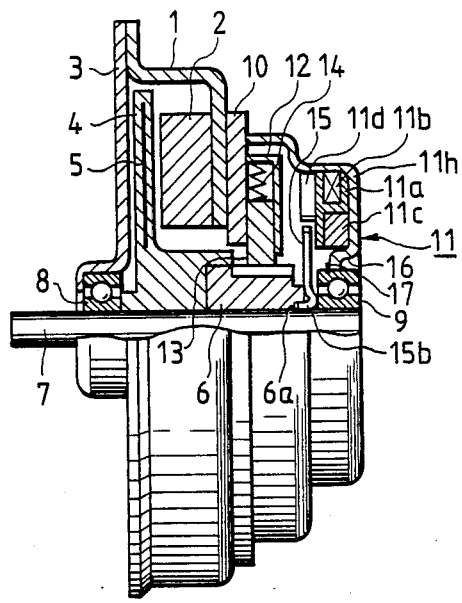
FIG. 1 shows a flat motor according to an embodiment of the present invention in partial cross section.
Figure 2:
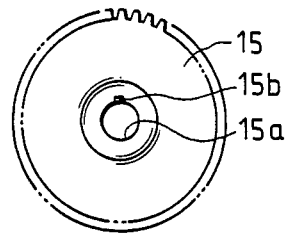
FIG. 2 is a front view of a rotor of the motor in FIG. 1.
Figure 3:
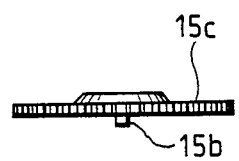
FIG. 3 is a side view of the rotor of the motor in FIG. 1.
Figure 4:
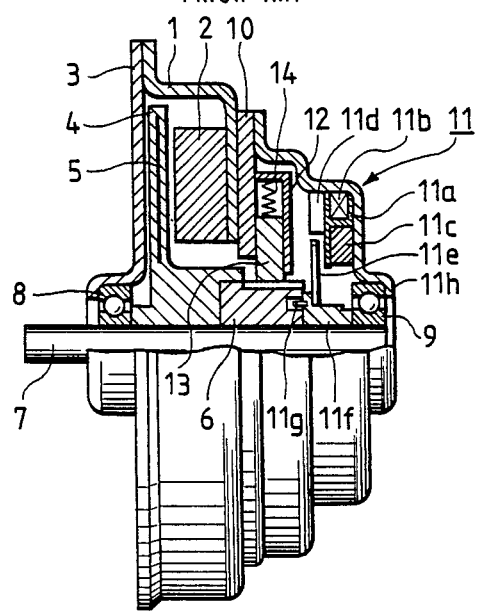
FIG. 4 shows a conventional flat motor in partial cross section.

In FIGS. 1 to 3 which show an embodiment of the present invention, a flat motor comprises a rear bracket 1 of magnetic material, a permanent magnet 2 secured to a side surface of the rear bracket 1, a front bracket 3 of magnetic material fixed to the rear bracket 1 with a gap therebetween, an armature 4 including a coil 5 disposed between the permanent magnet 2 and the front bracket 3, a commutator 6 connected to the coil 5 and coupled to the armature 4, a rotary shaft 7 supporting the armature 4 and the commutator 6, and bearings 8 and 9 for rotatably supporting the shaft 7. The motor further includes an adapter 10 secured to the rear bracket 1 by bolts which are not shown, a rotation detector 11 constituting a frequency generator, and a brush holder 12 housing brushes 13 and springs 14 for biasing the brushes 13 toward the commutator 6. The rotation detector 11 includes a bobbin 11a on which a coil 11b is wound, a permanent magnet 11c, a stator 11d having teeth formed on an inner periphery thereof, and a rotor 15 having an outer periphery facing the stator 11d. A cover 11h of magnetic material forms a detector housing.

The rotor 15 has teeth 15c formed on the outer periphery thereof which face the stator 11d, a shaft hole 15a into which the rotary shaft 7 thereof is to be inserted, and a tongue 15b formed by bending down an inwardly projecting portion formed at a portion of an inner periphery of the rotor 15.

The rotor 15 is fitted on the rotary shaft 7 with the tongue 15b inserted directly into a recess 6a formed in an end face of the commutator 6 which is also supported by the rotary shaft 7 as shown in FIG. 1.

In the flat motor of the present invention constructed as described above, magnetic flux from the magnet 11c flows, in succession through the rotor 15, the stator 11d, the cover 11h, a flange 16, the bearing 9, the rotary shaft 7, and back to the rotor 15. However, since the flange 16 comprises a thin iron plate and the magnetic contact thereof with the bearing 9 is limited to a small area corresponding to the thickness of the flange 16, magnetic reluctance of the by-pass or leakage circuit composed of the flange 16, the bearing 9, the rotary shaft 7 and the rotor 15 is very high, making the flux leakage therethrough negligible. Thus, the boss; which is indispensable in the conventional structure, becomes unnecessary.

As described, according to the present invention, it is possible to make the height of the flat motor smaller due to the fact that the conventional boss necessary to support the rotor can be eliminated. Further, due to the simple coupling mechanism between the rotor and the commutator, the flat motor becomes inexpensive compared with the conventional motor.

What is claimed is:

1. A flat motor, comprising: a rear bracket (1) of magnetic material, a permanent magnet (2) fixed to an end of said rear bracket, a front bracket (3) of magnetic material disposed facing said permanent magnet across an axial gap, an armature (4) having a coil (5) thereon, a rotary shaft (7) for rotatably supporting said armature between said front bracket and said permanent magnet, a commutator (6) pressure-fixed on said rotary shaft, and a rotation detector (11) including a rotor (15) fixed on said rotary shaft and having teeth (15c) along an outer periphery thereof, a stator (11d) having an inner periphery facing said rotor teeth, a cover member (11h) housing a magnet (11c) and a coil (11b), said cover member being affixed to said rear bracket, and coupling means (6a, 15b) defining a direct connection between said rotor and said commutator, wherein said coupling means comprises a tongue (15b) formed by bending a protruding portion of said rotor, and a recess (6a) formed in said commutator, said tongue being inserted into said recess to prevent rotation of said rotor relative to said commutator.

* * * * *